United States Patent Office 3,212,538
Patented Oct. 19, 1965

3,212,538
METHOD OF HANDLING AND
TRANSPORTING PAINT
Arthur S. Gay, 7905 W. 127th St., Palos Park, Ill.
No Drawing. Filed Aug. 27, 1962, Ser. No. 219,720
7 Claims. (Cl. 141—9)

This invention relates to a method of transporting a liquid containing finely-divided solids and, more particularly, to a method of transporting paint.

Transporting materials comprising a mixture of a liquid carrier and finely-divided solids wherein the density of the finely-divided solids is greater than the density of the liquid carrier oftentimes creates a troublesome problem—settling of the finely-divided solids. Such settling necessitates shaking or otherwise agitating the mixture to redisperse the finely-divided solids before use. In some instances, transporting such materials causes the solids to settle and agglomerate to such an extent that the solids may not be redispersed by ordinary agitation techniques and the only way the solids may be broken up is by grinding.

Illustrative of such materials are those "weld-through" paints which are non-thixotropic in character. Such paints contain a high percentage by weight, usually greater than 50 percent, of finely-divided solids such as zinc, manganese, magnesium, and the like. When these materials are transported over distance greater than 50 to 100 miles in drums or the like, the finely-divided solids settle to such an extent that it is impossible to redisperse them and the paint is thereby rendered inadequate for its intended function.

It is, therefore, an object of the present invention to provide a method for transporting liquids which contain finely-divided solids whereby settling of the finely-divided solids in the liquid during transit is substantially reduced.

It is a further object of the present invention to provide a method for transporting liquids which contain finely-divided solids having a greater density than the liquids whereby settling of the finely-divided solids in the liquid during transit is substantially reduced.

It is a still further object of the present invention to provide a method of transporting paint which contains finely-divided solids whereby settling of the solids during transit will be substantially reduced.

It is still another object of the present invention to provide a method of transporting a non-thixotropic paint containing a large percentage by weight of finely-divided solids whereby the finely-divided solids will not settle during transit to the extent that they may not be redispersed in the paint by ordinary agitation techniques.

The invention, taken with further objects and advantages thereof, will best be understood from the following detailed description thereof.

The method of the present invention reduces settling of finely-divided solids in many different materials, of which pharmaceutical preparations and paint are exemplary. As will be understood more fully hereinafter, the present method is, however, applicable solely to materials which comprise (1) a liquid carrier having finely-divided solids therein; (2) the liquid carrier comprising two liquid fractions which are miscible when stirred, but may be separated and formed into two distinct layers due to the difference in their specific gravities; and (3) the density of the finely-divided solids is greater than that of the liquid carrier or any of its liquid fractions.

Therefore, though the method of the present invention is applicable to many different materials, it will be described in particularity, for purposes of illustration, with respect to a specific non-thixotropic, "weld-through" paint which is disclosed in applicant's copending application, Serial No. 198,466, filed May 29, 1962. This paint comprises in the range of about 70 to 80 percent by weight of a pigment and about 3.5 to 7 percent by weight of a non-volatile or solids fraction. The remainder of the paint is the voliatile fraction of the vehicle or solvent. The pigment employed is finely-divided aluminum, magnesium, manganese, chromium, zinc, cadmium, or the like.

The volatile fraction of the vehicle employed in the paint comprises VMP naphtha, mineral spirits or other solvents well known to those skilled in the paint field.

The non-volatile fraction of the vehicle of this paint is an epoxy-polyamide resin. This non-volatile fraction is made by reacting an epoxy resin with tall oil fatty acids, linseed oil, soya oil, cotton seed oil, dehydrated castor oil, tung oil or mixtures thereof. The tall oil fatty acids contain rosin acids. Suitable epoxy resins are those made from reacting epichlorohydrin and Bisphenol A. The reaction of the solid epoxy resin with the tall oil fatty acids or one of the other oils mentioned above is conducted in a kettle at a temperature in the range of about 470° to 550° F. This heated environment is maintained until the epoxy resins and the oil have reacted by esterification with the release of small amounts of water. An inert gas may be employed during the reaction.

The reaction product is cooled to below about 350° F., preferably below about 300° F. Mineral spirits in the amount of about 33 percent by weight of the reaction product is added to the reaction product. This cools the mixture sufficiently to allow the addition of VMP naphtha (50° F.+ flashpoint) which is then added in sufficient amounts to comprise about 66⅔ percent by weight of the reaction product.

The mixture of reaction product and solvent is then transferred to a second kettle where the mixture is held at a temperature in the range of about 200° to 250° F. The VMP naphtha is refluxed during which time a linear-type polyamide resin is added to and reacted with the mixture in the second kettle. The polyamide resin reacts with the epoxy resin reaction product to form the non-volatile fraction of this weld-through paint.

The mixture from the second kettle is transferred to a mixer where small amounts of additional VMP naphtha are added to make it easier to work with the vehicle. While mixing this mixture at room temperature a pigment, such as finely-divided zinc, is added in sufficient amounts to comprise in the range of about 75 to 90 percent by weight of the total mixture. The remaining portion of this mixture comprises about 10 percent of volatile constituents and 5.2 percent by weight are solids. This mixture is passed through a series of screen, e.g., 140 mesh screen, to remove coarse particles of pigment and foreign material and then is passed into drums.

In accordance with the present invention this paint mixture is placed in drums, each drum being filled about two-third full. The drums are filled by adding VMP naphtha, or another solvent, or mixture thereof, onto the liquid already in the drum. This additional solvent represents the remaining part of the paint and is added to the drum in such a manner that it will form a distinct second liquid layer with the paint mixture. This is possible because of the added solvent having a specific gravity less than that of the paint mixture previously placed in the drum. The drum is then sealed and is ready for transporting.

The paint mixture placed in the drum may be at a temperature as high as about 110° F. Preferably, after the paint has been placed in the drum it is cooled to a temperature within the range of about 35° to 45° F. This assures that only a minimal amount, at most, of the solvent will mix with the paint mixture when it is subsequently added thereto.

In accordance with the present invention the paint is transported in this two-layer form in the drum under refrigerated conditions. The temperature of the paint is maintained in the range of about 35° to 45° F. It has been found that this method reduces settling and agglomeration of the finely-divided pigment. In this manner any finely-divided pigment which may tend to settle may readily be redispersed in the paint by ordinary agitation techniques. It will be understood that when the paint has reached the destination, the drum is agitated or stirred to mix the two liquid layers and the solids into a homogeneous mixture. This paint mixture is then employed in a spray gun or the like.

The following example illustrates the improved results obtained by the method of the present invention.

EXAMPLE I

A weld-through paint was made in accordance with the method discussed hereinabove, further details of which are disclosed in applicant's copending application mentioned hereinabove. Sufficient non-volatile fraction, which also contains the finely-divided pigment and some of the solvent as previously discussed, was poured into a thirty gallon drum to fill the drum about two-thirds full. This will hereinafter be referred to as the "bottom layer." The drum was then filled with VMP naphtha to form a second layer, hereinafter referred to as the "top layer." The drum so filled in two layers will be referred to as Drum No. 1. Table A below indicates the composition of the bottom and top layers in Drum No. 1 and the composition of the paint when the two layers' constitutents are mixed, which, in the case of Drum No. 1, is after transporting and just prior to use.

Table A

|   | Percent by Weight of Layer | Percent by Weight of Mixed Paint [1] |
|---|---|---|
| I. Botton Layer: |  |  |
| Pigment | 84 | 75.8 |
| Zinc | 84 | 75.8 |
| Solids Fraction | 5.2 | 4.7 |
| Epon 1004, 33.56% by wt. of solids fraction | 1.75 | 1.6 |
| Rosin acids, 11.27% by wt. of solids fraction | .59 | 0.5 |
| Tall oil fatty acids, 45.07% by wt. of solids fraction | 2.35 | 2.2 |
| Omamid S resin, 6.1% by wt. of solids fraction | .32 | 0.3 |
| Solvent | 10.8 | 19.5 |
| Mineral Spirits, 33⅓% by wt. of solvent fraction | 3.6 | 6.5 |
| VMP naptha, 66⅔% by wt. of solvent fraction | 7.2 | 13.0 |
| II. Upper Layer: |  |  |
| Solvent | 100 |  |
| VMP Naptha | 100 | 9.7 |

[1] When the two layers are mixed.

Drum No. 2, a 30 gallon drum, was prepared in the same manner with the same paint with the exception that the two layers were stirred to form a homogeneous mass prior to transporting the drum of paint.

Drum No. 1 was placed on a truck and transported therein under refrigerated conditions from Blue Island, Illinois, to Grand Rapids, Michigan, and back. The temperature of the two layers of paint was maintained within the range of 35° to 45° F. When Drum No. 1 was opened after this round trip, some zinc had settled in the bottom; however, the paint, when agitated, formed a homogeneous mass with no difficulty.

Drum No. 2 was also shipped round trip from Blue Island, Illinois, to Grand Rapids, Michigan, and opened upon completion of the round trip. Upon attempting to remix the settled zinc with the paint, it was found that a large portion of the settled zinc had agglomerated to the point that it could not be remixed with the paint. It had agglomerated into a tough, large piece of zinc which was not affected by ordinary agitation procedures. The zinc could only be broken apart by grinding or the like.

From the above example, it is apparent that the present invention affords a method whereby such liquids containing finely-divided solids may be transported over long distances with reduced sedimentation of the finely-divided solids. Also this method eliminates the tendency of the finely-divided solids to agglomerate.

It will be understood that the present invention is beneficial whether the mixtures are transported by car, rail, airplane, ship, or the like.

While the embodiment described herein is at present considered to be preferred, it will be understood that various modifications and improvements may be made therein, and it is intended to cover in the appended claims all such modifications and improvements as fall within the true spirit and scope of the invention.

What is desired to be claimed and secured by Letters Patent of the United States is:

1. A method of transporting a material comprising (1) a liquid carrier having a finely-divided solid therein, (2) the liquid carrier comprising at least two liquid fractions which are miscible and may be separated to form two distinct layers because of the difference in their specific gravities, and (3) said finely-divided solids having a tendency to settle in said liquid carrier and having a density greater than the density of any of said liquid fractions of said liquid carrier, said method comprising placing the heaviest of said liquid fractions in a container, said heavy liquid fraction having said finely-divided solids therein, placing said other liquid fractions on said heaviest liquid fraction to form at least two distinct liquid layers, and transporting said container containing said other liquid fractions on said heaviest liquid fraction while said material is in a refrigerated state.

2. A method for transporting a liquid carrier with finely-divided solids therein, said finely-divided solids when transported in said liquid carrier undesirably settling in said carrier, said carrier comprising two liquid fractions having different specific gravities, said fractions being miscible when stirred and forming two distinct liquid layers when separated, said method comprising placing the first liquid fraction in a container, said first liquid fraction having the larger specific gravity of said liquid fractions, said first liquid fraction having the finely-divided solids therein, placing said second liquid fraction in said container on said first liquid fraction to form two distinct liquid fractions, and transporting said liquid carrier in said two-layer form with said second liquid fraction on said first liquid fraction while said carrier is in a refrigerated state.

3. The method of claim 2 wherein said liquid carrier is maintained at a temperature within the range of about 35° to 45° F.

4. A method for transporting a paint which includes a finely-divided metallic pigment, a non-volatile fraction and a volatile fraction which comprises forming a first and second layer in a container, said first layer having a higher specific gravity than said second layer and comprising said non-volatile fraction, said pigment and a portion of said volatile fraction, said second layer comprising the other portion of said volatile fraction, and transporting said paint under refrigerated conditions while said paint is in said two layers with said second layer on said first layer.

5. The method of claim 4 wherein said paint is maintained at a temperature in the range of about 35° to 45° F. during transporting thereof.

6. A method for transporting a paint which comprises a finely-divided metallic pigment, a non-volatile fraction and a volatile fraction, said non-volatile fraction comprising the reaction product of (a) the product of reacting an epoxy resin with a drying oil selected from the group consisting of linseed oil, soya oil, cottonseed oil, dehydrated castor oil, tung oil, tall oil, fatty acids having rosin acids, and mixtures thereof and (b) a linear-type polyamide at a temperature in the range of about 200° to 250° F., said method comprising forming a first and second layer in a transporting container, said first layer having a higher specific gravity than said second layer and comprising said non-volatile fraction, said pigment and a portion of said volatile fraction, said second layer comprising the other portion of said volatile fraction, and transporting said paint in said two layers with said second layer on said first layer while said paint has a temperature in the range of about 35° to 45° F.

7. The method of claim 6 wherein said first layer is cooled to a temperature in the range of about 35° to 45° F. before said second layer is placed thereon.

References Cited by the Examiner

UNITED STATES PATENTS

| | | | |
|---|---|---|---|
| 2,589,031 | 3/52 | Allyne | 62—62 |
| 3,862,616 | 12/58 | Capozzi et al. | 206—47 |

LAVERNE D. GEIGER, *Primary Examiner.*